United States Patent
Mariager

(10) Patent No.: US 12,111,192 B2
(45) Date of Patent: *Oct. 8, 2024

(54) MAGNETIC-INDUCTIVE FLOW METER AND METHOD FOR OPERATING A MAGNETIC-INDUCTIVE FLOW METER

(71) Applicant: Endress+Hauser Flowtec AG, Reinach (CH)

(72) Inventor: Simon Mariager, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 247 days.

This patent is subject to a terminal disclaimer.

(21) Appl. No.: 17/628,602

(22) PCT Filed: Jun. 18, 2020

(86) PCT No.: PCT/EP2020/066993
§ 371 (c)(1),
(2) Date: Jan. 20, 2022

(87) PCT Pub. No.: WO2021/018470
PCT Pub. Date: Feb. 4, 2021

(65) Prior Publication Data
US 2022/0276081 A1    Sep. 1, 2022

(30) Foreign Application Priority Data

Jul. 26, 2019    (DE) .................. 102019120315.5

(51) Int. Cl.
*G01F 1/58*    (2006.01)
*G01F 1/60*    (2006.01)
*G01N 11/00*    (2006.01)

(52) U.S. Cl.
CPC .............. *G01F 1/588* (2013.01); *G01F 1/60* (2013.01); *G01N 11/00* (2013.01); *G01N 2011/0026* (2013.01)

(58) Field of Classification Search
CPC ............ G01F 1/588; G01F 1/584; G01F 1/60; G01N 11/00
See application file for complete search history.

(56) References Cited

U.S. PATENT DOCUMENTS 6,094,992 A    8/2000  Mesch et al.
2008/0127712 A1  6/2008  Baker
(Continued)

FOREIGN PATENT DOCUMENTS

EP    0770855 A1    5/1997
JP    06175217 A    6/1994
(Continued)

OTHER PUBLICATIONS

Mesch, et al., Tomographische Methoden bei der induktiven Durchflußmessung zur Bestimmung von Strömungsprofilen und -parametern, Oct. 1997, pp. 365-373 (English Translation Provided).

*Primary Examiner* — Suman K Nath
(74) *Attorney, Agent, or Firm* — Christopher R. Powers; Endress+Hauser (USA) Holding, Inc.

(57) ABSTRACT

A magnetic-inductive flow meter includes: a measuring tube for conducting a flowable medium, the measuring tube having a wall; at least three measuring electrodes arranged in the wall to form a galvanic contact with the flowing medium; a magnetic field-generating device for generating a magnetic field that passes through the medium; a measuring circuit designed to ascertain at least one first measurement variable, wherein measured values of the first measurement variable are ascertained at a first measuring electrode pair; and an analysis circuit designed to ascertain a Reynolds number and/or a kinematic viscosity value of the medium in the measuring tube using measured values for the first measurement variable and a second measurement variable, which differs from the first measurement variable, the mea- (Continued)

sured values of the second measurement variable being ascertained at a second measuring electrode pair.

15 Claims, 4 Drawing Sheets

(56) References Cited

U.S. PATENT DOCUMENTS

2018/0372523 A1* 12/2018 Alkhabbaz ................ G01F 1/24
2021/0164814 A1*  6/2021 Mariager ................ G01F 1/584
2021/0364331 A1* 11/2021 Mariager ................ G01F 1/584

FOREIGN PATENT DOCUMENTS

JP           6175217 B2    8/2017
WO        2015050460 A1    4/2015

* cited by examiner

MAGNETIC-INDUCTIVE FLOW METER AND METHOD FOR OPERATING A MAGNETIC-INDUCTIVE FLOW METER

CROSS-REFERENCE TO RELATED APPLICATIONS

The present application is related to and claims the priority benefit of German Patent Application No. 102019120315.5, filed on Jul. 26, 2019, and International Patent Application No. PCT/EP2020/066993, filed Jun. 18, 2020, the entire contents of which are incorporated herein by reference.

TECHNICAL FIELD

The present disclosure relates to magnetic-inductive flow meters and methods for operating magnetic-inductive flow meters, in particular magnetic-inductive flow meters having measuring electrode pairs.

BACKGROUND

Magnetic-inductive flow meters are used for determining the flow rate and the volumetric flow of a flowing medium in a pipeline. A magnetic-inductive flow meter has a magnet system that generates a magnetic field perpendicular to the flow direction of the flowing medium. Single or multiple coils are typically used for this purpose. In order to realize a predominantly homogeneous magnetic field, pole shoes are, in addition, shaped and attached in such a way that the magnetic-field lines extend over the entire tube cross-section so as to be substantially perpendicular to the transverse axis or parallel to the vertical axis of the measuring tube. A measuring electrode pair attached to the lateral surface of the measuring tube taps an electrical measuring voltage or potential difference which is applied perpendicularly to the flow direction and to the magnetic field and occurs when a conductive medium flows in the flow direction when the magnetic field is applied. Since, according to Faraday's law of induction, the tapped measuring voltage depends upon the speed of the flowing medium, the flow rate u and, with the aid of a known tube cross-section, the volumetric flow $\dot{V}$ of the medium can be determined from the induced measuring voltage U. For the measuring voltage U, the following simplified equation applies:

$$U = f(\text{Re}) \cdot u \cdot S,$$

where S is a nominal signal strength dependent upon the sensor geometry and magnetic field, and $f(\text{Re})$ is a correction factor dependent upon flow profile or Reynolds number. The correction factor $f(\text{Re})$ is usually assumed to be constant. However, this is not always the case. The nominal signal strength S is usually determined during the calibration of the meter and is stored in the meter.

The Reynolds number of a flowing medium in a measuring tube is defined by:

$$\text{Re} = \rho \cdot u \cdot \frac{DN}{\mu} = u \cdot \frac{DN}{\nu},$$

with the diameter of the measuring tube DN, the density of the medium $\rho$, the dynamic viscosity $\mu$, and the kinematic viscosity $\nu$ of the medium.

Magnetic-inductive flow meters are sensitive to the Reynolds number of the medium in the measuring tube, since the Reynolds number determines the flow profile of the flowing medium.

Depending upon the tube system, meter, and installation scenario, the correction factor $f(\text{Re})$ can vary and deviate from the assumed constant value by several percent. The arrangement of the measuring electrodes and the magnetic-field-generating device is usually optimized in such a way that the flow meter is as linear as possible, i.e., the induced measuring voltage is independent of the Reynolds number over as large a Reynolds-number range as possible or for the Reynolds-number range of interest for the specific application. Thus, flow meters which have a deviation of a few percent in transition flow areas, and flow meters which have deviations of approximately 0.2% for flows with a turbulent flow profile, are already industry standard.

In conventional magnetic-inductive flow meters, the flow rate and the correction factor $f(\text{Re})$ dependent upon the Reynolds number cannot be determined at the same time from the measuring voltage induced in the medium and tapped with the measuring electrodes. Therefore, $f(\text{Re})$ is assumed to be constant. It is therefore absolutely necessary to adapt the electrode system, the magnet system, and the tube geometry of the magnetic-inductive flow meter in such a way that $f(\text{Re})$ is constant over the largest possible Reynolds-number range. This adaptation always entails restrictions, such as the loss of the signal strength or the dependence upon the pole shoe geometry.

EP 0 770 855 A1 teaches a magnetic-inductive flow meter for measuring non-Newtonian liquids which has analysis electronics designed to determine the flow index and the apparent viscosity of a flowing medium. Two measuring electrodes are arranged in the measuring tube in such a way that two radii intersecting the respective measuring electrodes span an angle of 90° or 120°. A changeover switch is designed to connect two coils in series either in the same direction or in opposite directions. The potential difference between the two measuring electrodes is determined successively for the two coil settings and is used to determine the flow index and the apparent viscosity of the medium.

It is thus known in principle from the prior art to allow additional flow properties to be determined by modifying the magnetic-field-generating device and the measuring electrode arrangement. However, a disadvantage of the known prior art is that at least two measuring phases with different coil settings are always required for the determination of the flow index, in which at least two measuring phases the magnetic field must restabilize again in each case before measurement can be carried out.

SUMMARY

The invention is therefore based upon the aim of specifying a magnetic-inductive flow meter and a method for operating the magnetic-inductive flow meter that manages with one coil setting.

The aim is achieved by the magnetic-inductive flow meter and by the method for operating the magnetic-inductive flow meter according to the present disclosure.

The magnetic-inductive flow meter according to the invention comprises: a measuring tube for conducting a flowable medium, wherein the measuring tube has a wall; at least three measuring electrodes that are arranged in the wall and form a galvanic contact with the flowing medium; at least one magnetic-field-generating device for generating a magnetic field that passes through the measuring tube; and a measuring circuit that is designed to ascertain at least one first measurement variable, wherein measured values of the first measurement variable are ascertained at a first measuring electrode pair, especially at a first and second measuring electrode, and is characterized in that an analysis circuit is designed to ascertain a Reynolds number and/or a kinematic viscosity value of the medium in the measuring tube by means of measured values for the first and a second measurement variable, wherein measured values of the second measurement variable are determined at a second measuring electrode pair or at a third measuring electrode in relation to a reference potential.

It is particularly advantageous if the flow meter has at least three measuring electrodes. As a result, the meter can be designed in such a way that the measurement variable tapped at a first measuring electrode pair is independent of Reynolds number, and the measurement variable tapped at the second measuring electrode pair or measured at the third measuring electrode in relation to the reference potential is dependent upon the Reynolds number. If both measurement variables are known, the Reynolds number can be ascertained. It is not necessary to switch over the coil settings, and the Reynolds number can already be determined in a single measuring phase.

The measuring circuit is preferably designed such that it ascertains a first potential difference $U_1$ between a first measuring electrode pair and a second potential difference $U_2$ between a second measuring electrode pair. The measuring voltage is determined either by directly measuring the potential difference between the two measuring electrodes or by measuring the electrical potential respectively prevailing at the measuring electrodes in relation to a reference potential and calculating a difference. Here, $U_1 = f_1(Re) \cdot S_1 \cdot u$ and $U_2 = f_2(Re) \cdot S_2 \cdot u$, where $f_1(Re)$ and $f_2(Re)$ each describe a correction factor dependent upon the Reynolds number. The ascertained measured values are forwarded to an analysis circuit, which comprises a memory unit in which reference values and Reynolds numbers are stored or in which a mathematical function which assigns Reynolds numbers to reference values is stored.

Alternatively, the first potential difference $U_1$ is measured at the first measuring electrode pair, and an electrical potential in relation to a reference potential is measured at the third measuring electrode.

It is particularly advantageous if the analysis circuit is designed to calculate quotients of the measured values, to compare them with the reference values in the data memory, and to determine or read out the Reynolds number assigned to the reference value. Alternatively, a mathematical function can be stored in the memory unit, which mathematical function assigns measured values of the first and second measurement variables, or a term which depends upon the first and second measurement variables, to the Reynolds number of the medium. In this case, the analysis circuit is designed to determine the Reynolds number with the measured values of the two measurement variables and the stored mathematical function. If the Reynolds number, the flow rate, and the tube diameter are known, the kinematic viscosity can be calculated, for which $v = u \cdot DN/Re$ applies.

Measuring circuits in the field of flow measurement technology are well-known. The object of the measuring circuit is to detect very small absolute values and changes in the respective measurement variable. There are many different designs, each having its advantages and disadvantages. For one, the measuring circuit can be designed to tap a potential at one of the measuring electrodes in relation to a reference potential. Even if one of the two measuring electrodes fails, the flow rate can therefore still be determined on the basis of an ascertained potential. The housing potential or a ground potential is suitable as the reference potential. For another, the measuring circuit can be designed such that it detects and receives a potential difference prevailing between two measuring electrodes. A measuring circuit therefore usually comprises an analog-digital converter which converts the incoming signals—in this case, the potential difference currently present at the respective measuring electrode pair—into digital data, which are then further processed or stored by an analysis circuit. However, other measuring converters or measuring transducers in digital measuring technology are also known and suitable.

The analysis circuit is designed to process the measured values measured by the measuring circuit and to ascertain the sought measurement variable from the noise. An analysis circuit therefore usually comprises microprocessors, amplifiers, and noise filters. The measuring and analysis circuit can be of modular design and can communicate by means of a wireless connection, or can be part of a single measuring and analysis electronics unit which is arranged in a housing of the meter.

Advantageous embodiments of the invention are the subject matter of the subclaims.

According to one embodiment, the measuring electrodes are arranged in the measuring tube in such a way that, in a test measurement, quotients of current measured values of the first and second measurement variables correspond bijectively to the Reynolds number of the flowing medium in the measuring tube, at least within a Reynolds-number range of $10{,}000 \leq Re \leq 100{,}000$, especially $5{,}000 \leq Re \leq 500{,}000$ and preferably $1{,}000 \leq Re \leq 1{,}000{,}000$.

The position of the third measuring electrode is optimized in such a way that the quotient of the first and second potential differences $U_1/U_2$ behaves bijectively to the Reynolds number of the flowing medium in the measuring tube. The optimization can take place experimentally or by means of a simulation method, e.g., by means of finite element simulations.

For the quotient $U_1/U_2$, assuming that the flow rate in the measuring tube is constant or that the respective induced measuring voltage originates in a common flow rate u, there results:

$$\frac{U_1}{U_2} = \frac{f_1(Re)}{f_2(Re)} \cdot \frac{S_1}{S_2} = g(Re) \cdot \frac{S_1}{S_2}.$$

If g(Re) is invertible, the following also applies:

$$Re = g^{-1}\left(U_1 \cdot \frac{S_2}{S_1 \cdot U_2}\right),$$

where $g^{-1}$ is the inverse function of g. The bijectivity of the quotient can most easily be realized by attaching the first and second measuring electrodes in the measuring tube in such a way that the first correction factor $f_1(Re)$ is independent of the Reynolds number over the Reynolds-number range. In this case, the second correction factor $f_2$ must correspond bijectively to the Reynolds number. The position of the third measuring electrode is therefore ideally selected such that the change in the correction factor $f_2(Re)$ or the slope of the quotient for different Reynolds numbers is as large as possible.

The positioning of the individual measuring electrodes in the measuring tube is critical for determining the Reynolds number or the kinematic viscosity. Measured values of two measurement variables are required to determine the Reynolds number. The first measurement variable is determined with the measuring circuit at a measuring electrode pair. The same preferably also applies for the second measurement variable. However, the position of the individual measuring electrodes cannot be selected arbitrarily. It must be the case that the quotient of the measured values of the first and second measurement variables corresponds bijectively to the Reynolds number of the flowing medium in the measuring tube. This means that the quotients of the measured values of the first and second measurement variables, measured over a Reynolds-number range, can be described by a function which is bijective to the Reynolds number or that the set of the quotients of the measured values over a Reynolds-number range correspond bijectively to the linked set of Reynolds numbers.

This is realized, for example, by attaching the first measuring electrode pair to the measuring tube diametrically, as is customary in conventional flow meters, and arranging the third measuring electrode or the third and fourth measuring electrodes offset from the first measuring electrode pair.

The measured values of the first measurement variable are thus substantially independent of the Reynolds number, and the measured values of the second measurement variable are dependent upon the Reynolds number. However, this is not the only possibility for realizing a flow meter according to the invention. It is also conceivable for all the measuring electrodes to be arranged in such a way that the measured values tapped at the measuring electrodes are dependent upon the Reynolds number over the Reynolds-number range or over a part of the Reynolds-number range. In this case, however, the quotient of the measured values must correspond bijectively to the Reynolds number so that the Reynolds number can be determined.

The analysis circuit usually has a memory unit, wherein the memory unit has a first data set containing reference values which correlate with the first and second measurement variables and, especially, are proportional to the quotient of the first and second measurement variables, wherein the memory unit has a second data set containing Reynolds numbers, wherein the first and the second data sets correspond bijectively, wherein the analysis circuit is designed to ascertain the corresponding Reynolds number of the medium in the measuring tube on the basis of the first and second measurement variables.

A non-volatile memory, such as flash memory or EPROM, is suitable as a memory unit. This can be integrated into the analysis circuit or provided separately. The memory unit preferably has at least a first and a second data set. Reference values are stored in the first data set. These originate from computer simulations or from calibration measurements. The reference values can, for example, be quotients of the simulated or measured values of the first measurement variable and of the second measurement variable. The second data set has Reynolds numbers assigned to the quotients. Alternatively, pairs, consisting in each case of a Reynolds number and a reference value, can be stored in the memory unit. Alternatively, a mathematical function which assigns Reynolds numbers to the two measurement variables or to a term which depends upon the two measurement variables can also be stored in the memory unit.

The test measurement is carried out experimentally or by means of a simulation program.

According to a first embodiment, the measuring electrodes lie substantially in a cross-sectional plane, wherein a first radius intersecting the second measuring electrode and a second radius intersecting the third measuring electrode span an angle $\alpha$ where $\alpha \geq 20°$, especially $\alpha \geq 30°$ and preferably $40° \leq \alpha \leq 60°$, wherein the measuring circuit is designed to ascertain measured values of the first measurement variable between the first and second measuring electrodes, wherein the measuring circuit is designed to ascertain measured values of the second measurement variable between the first and third measuring electrodes or at the third measuring electrode in relation to the reference potential.

It is advantageous if the flow meter has exactly three measuring electrodes. This reduces the number of potential leakage points to three. This embodiment can most easily be realized by adding a further measuring electrode to a conventional magnetic-inductive flow meter with two measuring electrodes. With the claimed angles maintained, a magnetic-inductive flow meter can thus be realized which fulfills the prerequisite for determining the Reynolds number of the medium.

According to a second embodiment, a first measuring electrode axis intersecting a first and a second measuring electrode and a second measuring electrode axis intersecting a third and a fourth measuring electrode extend substantially in parallel, wherein the measuring circuit is designed to ascertain measured values of the first measurement variable between the first and second measuring electrodes, wherein the measuring circuit is designed to ascertain measured values of the second measurement variable between the third and fourth measuring electrodes.

In conventional magnetic-inductive flow meters, the magnet system and the position of the measuring electrodes are optimized such that the electric potential respectively prevailing at the measuring electrodes correlates linearly with the flow rate. If a third measuring electrode is now added, and the potential difference between the third and one of the two measuring electrodes is measured, the influence of the linearized system is always included in the second measurement variable. However, this should be dependent upon the Reynolds number over the largest possible Reynolds-number range.

It is therefore particularly advantageous if the measured values of the second measurement variable are tapped at the third and a fourth measuring electrode, which are arranged offset from the first measuring electrode pair. As a result, the potential difference present at the second measuring electrode pair is also decoupled from the two potentials of the first measurement variable.

It is particularly advantageous if the first measuring electrode pair is arranged diametrically or lying on the transverse axis of the measuring tube.

According to one embodiment, the first measurement variable and the second measurement variable are a potential difference between one measuring electrode pair each.

In order to avoid common-mode interference and thus to minimize the noise in the signal, it is advantageous if the two measurement variables are not potentials in relation to a reference potential, but rather potential differences that are measured.

According to one embodiment, the Reynolds number of the medium in the measuring tube is greater than 1,000, especially greater than 5,000 and preferably greater than 10,000, wherein the Reynolds number of the medium in the measuring tube is less than 1,000,000, especially less than 500,000 and preferably less than 100,000.

According to one embodiment, the first measurement variable, in the test measurement, behaves substantially proportionally to the flow rate of the medium within a Reynolds-number range of 10,000≤Re≤1,000,000, wherein, in the test measurement, the change in the second measurement variable with increasing Reynolds number within a Reynolds-number range of 10,000≤Re≤1,000,000 is not constant.

In the case of Reynolds numbers less than 1,000, the flow is in a transition region between turbulent and laminar flow, and $f(Re)$ can no longer be described by a defined function. $f(Re)$ exhibits hysteresis behavior or varies over time. In the case of large Reynolds numbers, the flow profile is independent of the Reynolds number, and therefore $f(Re)$ is constant for both measurement variables. In this case, the Reynolds number cannot be determined.

According to one embodiment, in the test measurement, the medium is a Newtonian fluid, especially water, wherein, in the test measurement, the flow meter is introduced into a pipeline with a straight inlet section of at least 20 DN, and preferably at least 50 DN, such that a substantially symmetrical flow profile is present in a measurement region, wherein the measuring tube has a diameter of DN 80.

According to one embodiment, the magnetic-field-generating device comprises two, especially oppositely-attached, coils which are connected in series in the same direction.

Two opposing coils connected in series in the same direction each generate a magnetic field which predominantly points in the same direction as the magnetic field generated in each case by the other coil. In this case, the magnetic-field lines forming between the two coils extend substantially in parallel to an axis of symmetry connecting the two coils. It also the case that, when coils are connected in series in the same direction, current flows through the coils in the same direction. EP 0 770 855 A1 teaches the magnetic-field distribution of coils connected in series in the same direction and in opposite directions.

The method according to the invention for operating the magnetic-inductive flow meter comprises the following method steps:
 detecting a measured value of a first measurement variable and a measured value of a second measurement variable, wherein the respective measured values of the two measurement variables are ascertained at different measuring electrode pairs;
 ascertaining a Reynolds number dependent upon the measured values of the first and second measurement variables.

The measured values of the first and second measurement variables are detected with a measuring circuit. The detected measured values are evaluated in the analysis circuit, and the present Reynolds number of the medium is ascertained.

It is particularly advantageous if a quotient of the first and second measured values is calculated, and this is compared with stored reference values in the memory unit. In this case, the reference values can be quotients of measurement data that were previously tapped at the measuring electrode pairs in the calibration process. Alternatively, a mathematical function can also be stored in the memory unit, which mathematical function describes the relationship between the Reynolds number and the two measurement variables or the term dependent upon both measurement variables. The mathematical function can, for example, be a polynomial, especially a higher-order polynomial, which was derived from the measurement data determined during the calibration. If the measurement variables fulfill the aforementioned condition of bijectivity, the Reynolds number can be determined.

Advantageous embodiments of the invention are the subject matter of the subclaims.

According to one embodiment, the method according to the invention comprises the method step of:
 calculating a corrected flow rate and/or a corrected volumetric flow by means of a correction factor, wherein the correction factor depends upon the determined Reynolds number.

It is particularly advantageous if correction factors, especially one of the two correction factors $f_1$ and $f_2$, which are used to determine the flow rate and/or the volumetric flow more accurately, are stored in the memory unit. The correction factors can be determined in a simulation method or ascertained or measured in the calibration process.

According to one embodiment, the method according to the invention comprises the method step of:
 ascertaining a kinematic viscosity value, wherein the kinematic viscosity value is determined by means of measured values of the first or the second measurement variable and the ascertained Reynolds number.

According to one embodiment, a map which assigns Reynolds numbers to quotients of the first and second measurement variables is bijective, at least within a Reynolds-number range of 10,000≤Re≤100,000, especially 5,000≤Re≤500,000 and preferably 1,000≤Re≤1,000,000.

The measured values are output, for example, by means of a display attached to the flow meter or connected to the flow meter. Alternatively, the display can also be part of a smartphone or laptop and receive the measured values to be displayed from the analysis circuit via a wireless connection. Alternative output units known in process automation are systems for data transmission, such as fieldbuses or real-time Ethernet.

BRIEF DESCRIPTION OF THE DRAWINGS

The invention is explained in greater detail with reference to the following figures. The following are shown.

DETAILED DESCRIPTION

Figure 1:
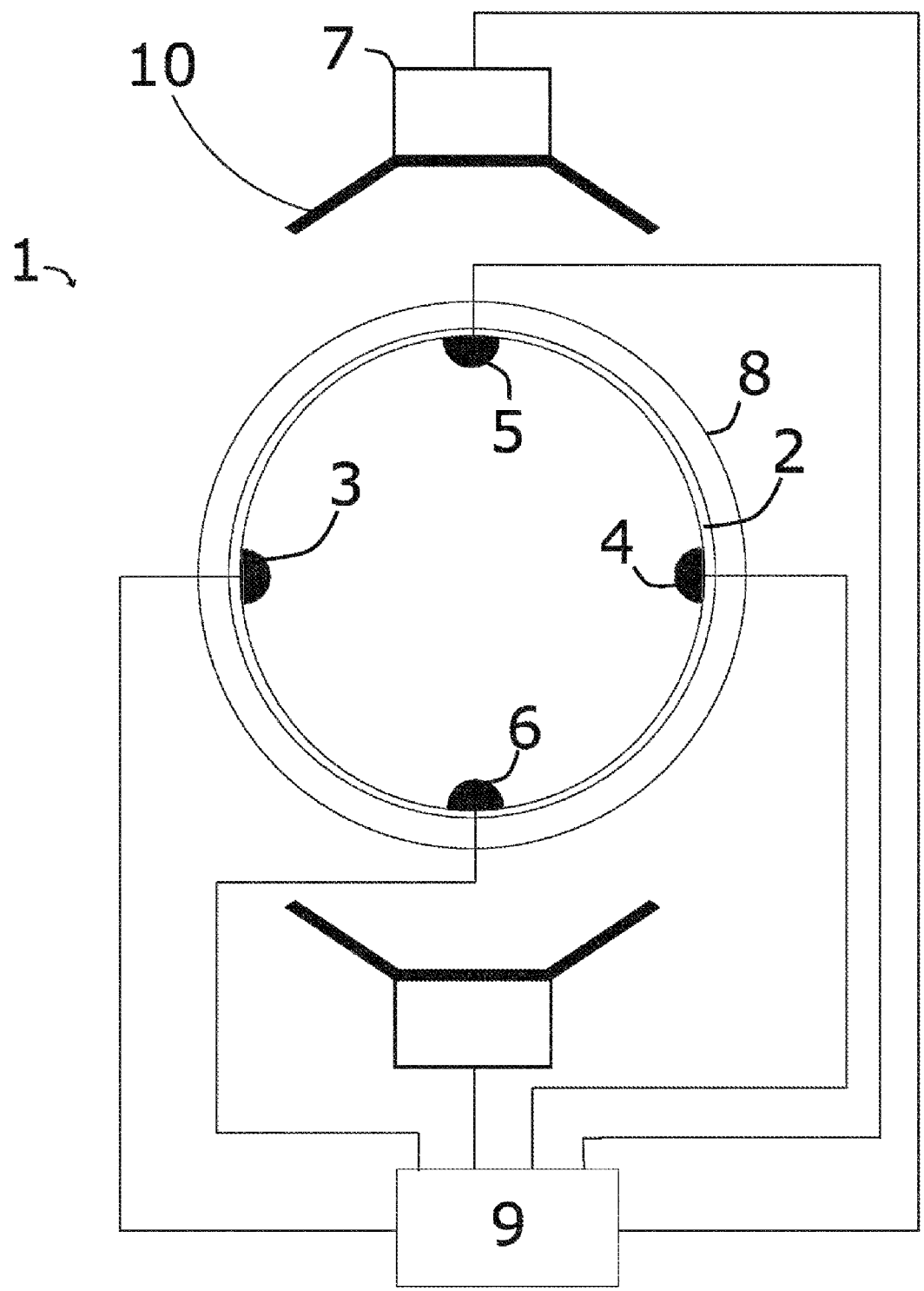
FIG. 1 shows a cross-sectional diagram of a magnetic-inductive flow meter according to the prior art.

FIG. 1 shows a magnetic-inductive flow meter known from the prior art. The structure and measuring principle of a magnetic-inductive flow meter are known, in principle. A medium having an electrical conductivity is conducted through a measuring tube (1). A magnetic-field-generating device (7) is attached in such a way that the magnetic-field lines are oriented to be substantially perpendicular to a longitudinal direction defined by the measuring tube axis. A saddle coil or a pole shoe (10) with mounted coil and coil core is preferably suitable as a magnetic-field-generating device (7). When the magnetic field is applied, a flow-dependent potential distribution arises in the measuring tube (1), which potential distribution is tapped with two, opposing measuring electrodes (3, 4) attached to the inner wall of the measuring tube (1). As a rule, these are arranged diametrically and form an electrode axis, or are intersected by a transverse axis which runs perpendicular to the magnetic-field lines and the longitudinal axis of the tube. On the basis of the measured measuring voltage U, taking into account the magnetic flux density, the flow rate can be determined, and, additionally taking into account the tube cross-sectional area, the volumetric flow of the medium can be determined. In order to prevent the discharge of the measuring voltage present at the first and second measuring electrodes (3, 4) via the pipe (8), the inner wall is lined with an insulating material—for example, a plastic liner (2). The magnetic field produced by a magnetic-field-generating device (7), e.g., an electromagnet, is generated by a direct current of alternating polarity clocked by means of an operating circuit. This ensures a stable zero-point and makes the measurement insensitive to influences caused by electrochemical interference. A measuring circuit is designed to read out the measuring voltage present at the first and second measuring electrodes (3, 4), and an analysis circuit is designed to ascertain the flow rate and/or the volumetric flow of the medium. Commercially available magnetic-inductive flow meters have two further electrodes (5, 6) in addition to the measuring electrodes (3, 4). For one, a fill-level monitoring electrode (5), optimally attached to the highest point in the pipe (8), is used to detect a partial filling of the measuring tube (1) and is designed to forward this information to the user and/or to take into account the fill-level in the determination of the volumetric flow. Furthermore, a reference electrode (6), which is usually attached diametrically to the fill-level monitoring electrode (5) or to the lowest point of the tube cross-section, is used to ensure sufficient grounding of the medium.

Magnetic-inductive flow meters according to the prior art are optimized according to their measuring electrode positioning and configuration of the magnetic-field-generating device in such a way that the flow meter is linear, i.e., that the correction factor $f$ (Re) is substantially constant for a specified measurement range. Thus, the following simplification applies in a first approximation:

$$U = f \cdot S \cdot u,$$

where $f$ is assumed to be constant for a Reynolds-number range, and S is determined via a calibration, i.e., measured in a known measuring environment and then stored in the meter for determining the flow rate and/or the volumetric flow.

Figure 2:
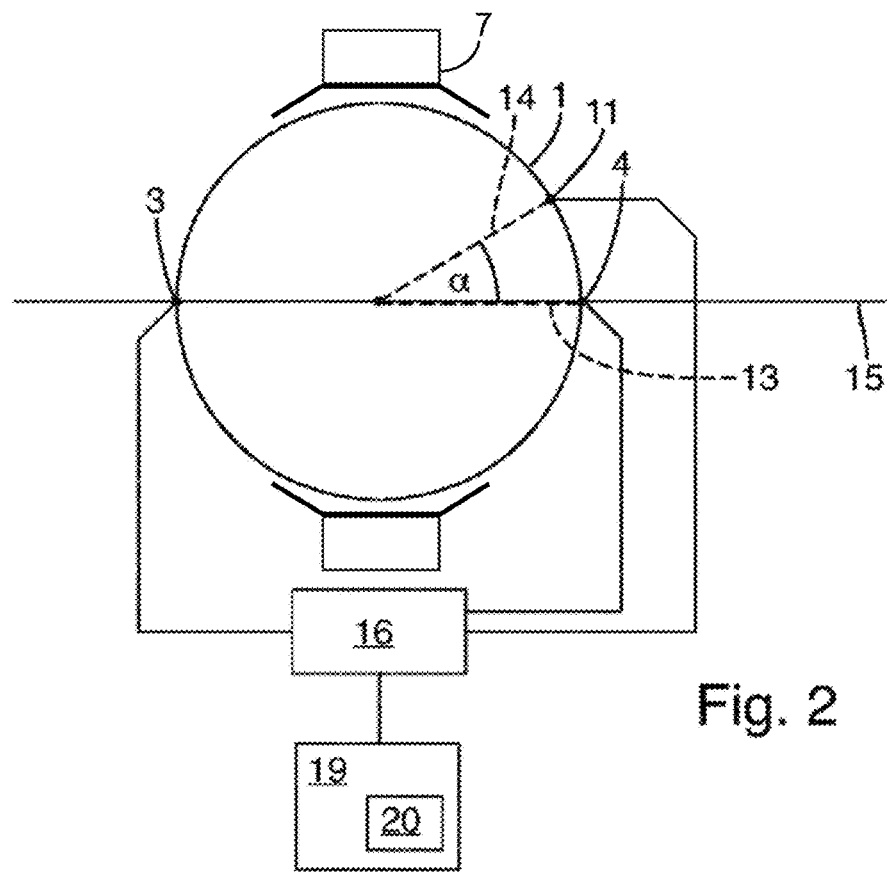
FIG. 2 shows a cross-sectional diagram of a first exemplary embodiment of the magnetic-inductive flow meter according to the present disclosure.

FIG. 2 shows a schematic cross-section of a first exemplary embodiment of the flow meter according to the invention. The first and second measuring electrodes (3, 4) are arranged diametrically and are adapted to the magnetic-field-generating device in such a way that the flow meter is linear over the specified Reynolds-number range. In addition to the first and second measuring electrodes (3, 4), a third measuring electrode (11) is arranged in the measuring tube (1). A second radius (14), intersecting the third measuring electrode (11), and a transverse axis (15) of the measuring tube span a central angle α. The measuring circuit (16) is designed such that it taps a first potential difference $U_1$ between the first and second measuring electrodes (3, 4) and a second potential difference $U_2$ between the first and third measuring electrodes (3, 11), where $U_1 = f_1(\text{Re}) \cdot S_1 \cdot u$ and $U_2 = f_2(\text{Re}) \cdot S_2 \cdot u$, where $f_1(\text{Re})$ and $f_2(\text{Re})$ each describe a correction factor dependent upon the Reynolds number. The position of the third measuring electrode (11) or the central angle α is optimized in such a way that the quotient of the first and second potential differences $U_1/U_2$ behaves bijectively to the Reynolds number of the flowing medium in the measuring tube, or that a mathematical function which maps the Reynolds number to the quotient is bijective. The arrangement can be optimized experimentally or by means of a simulation method—for example, by means of finite element simulations.

For the quotient $U_1/U_2$, there results:

$$\frac{U_1}{U_2} = \frac{f_1(\text{Re})}{f_2(\text{Re})} \cdot \frac{S_1}{S_2} = g(\text{Re}) \cdot \frac{S_1}{S_2}.$$

If g(Re) is invertible, the following also applies:

$$\text{Re} = g^{-1}\left(U_1 \cdot \frac{S_2}{S_1 \cdot U_2}\right),$$

where $g^{-1}$ is the inverse function of g. The bijectivity of the quotient can most easily be realized by attaching the first and second measuring electrodes in the measuring tube in such a way that the first correction factor $f_1(\text{Re})$ is independent of the Reynolds number over the Reynolds-number range. In this case, the second correction factor $f_2$ must correspond bijectively to the Reynolds number.

The measuring circuit (16) is designed to tap a potential difference between the first and second measuring electrodes (3, 4) and a potential difference at the first and third measuring electrodes (3, 11) or to measure an electrical potential at the third measuring electrode in relation to a reference potential. The measurement data are forwarded to an analysis unit, which comprises a memory unit in which reference values and Reynolds numbers are stored. The analysis circuit is designed to determine the Reynolds number of the medium in the measuring tube from the measured measurement data and the stored reference data. If the Reynolds number is known, the kinematic viscosity can be calculated with the aid of the measured values of the first or the second measurement variable, or of the already-determined flow rate or of the volumetric flow. The measuring circuit, analysis circuit, and memory unit can be arranged on an electronics unit in a different way from that depicted in the schematic diagram.

Figure 3:
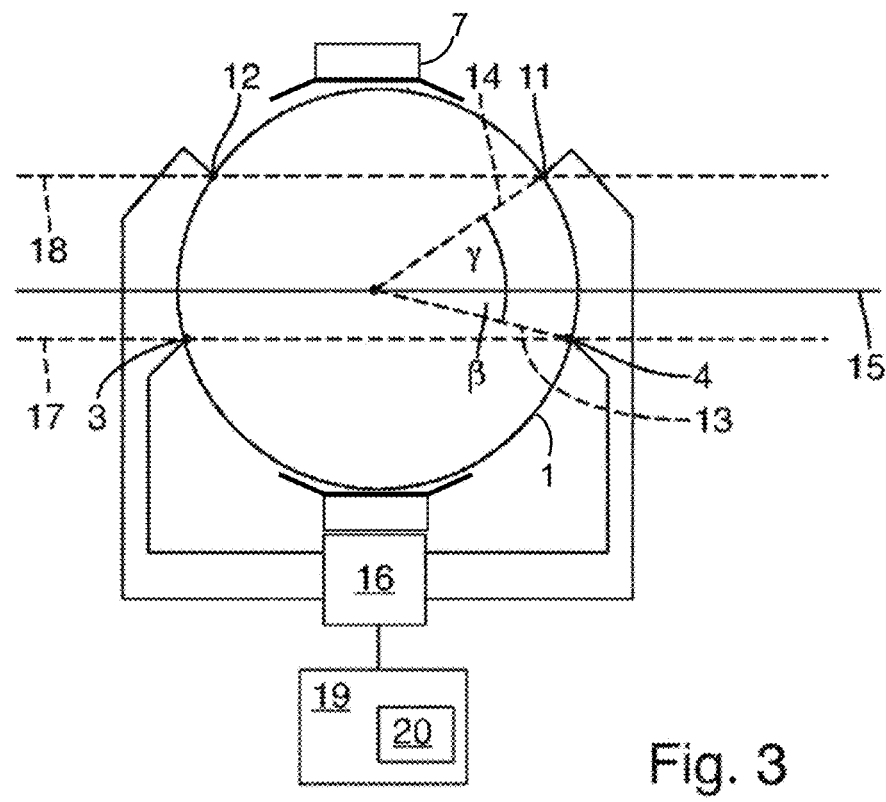
FIG. 3 shows a cross-sectional diagram of a second exemplary embodiment of the magnetic-inductive flow meter according to the present disclosure.

FIG. 3 shows a schematic cross-section of a second embodiment of the flow meter according to the invention. The first and second measuring electrodes (3, 4), which form a first electrode pair, are intersected by a first measuring electrode axis (17) which runs parallel to a second measuring electrode axis (18), intersecting the third measuring electrode (11) and a further, fourth measuring electrode (12), and to the transverse axis (15). The third and fourth measuring electrodes (11, 12) form a second measuring electrode pair. A first radius (13), intersecting the second measuring electrode (4), and the transverse axis (15) span a central angle β. The second radius (14), intersecting the third measuring electrode (11), and the transverse axis (15) span a central angle γ. The measuring circuit (16) is designed to tap the first potential difference at the first measuring electrode pair and the second potential difference at the second measuring electrode pair. Both central angles β and γ are selected or optimized in such a way that, in a test measurement, the quotient of the first and second potential differences $U_1/U_2$ or of the measured values and the Reynolds number of the flowing medium correspond bijectively. In the simplest case, the central angle β is set to zero, and the central angle γ is adjusted until the aforementioned condition is fulfilled, especially fulfills the condition for the Reynolds-number range $10,000 \leq Re \leq 1,000,000$.

Figure 4:
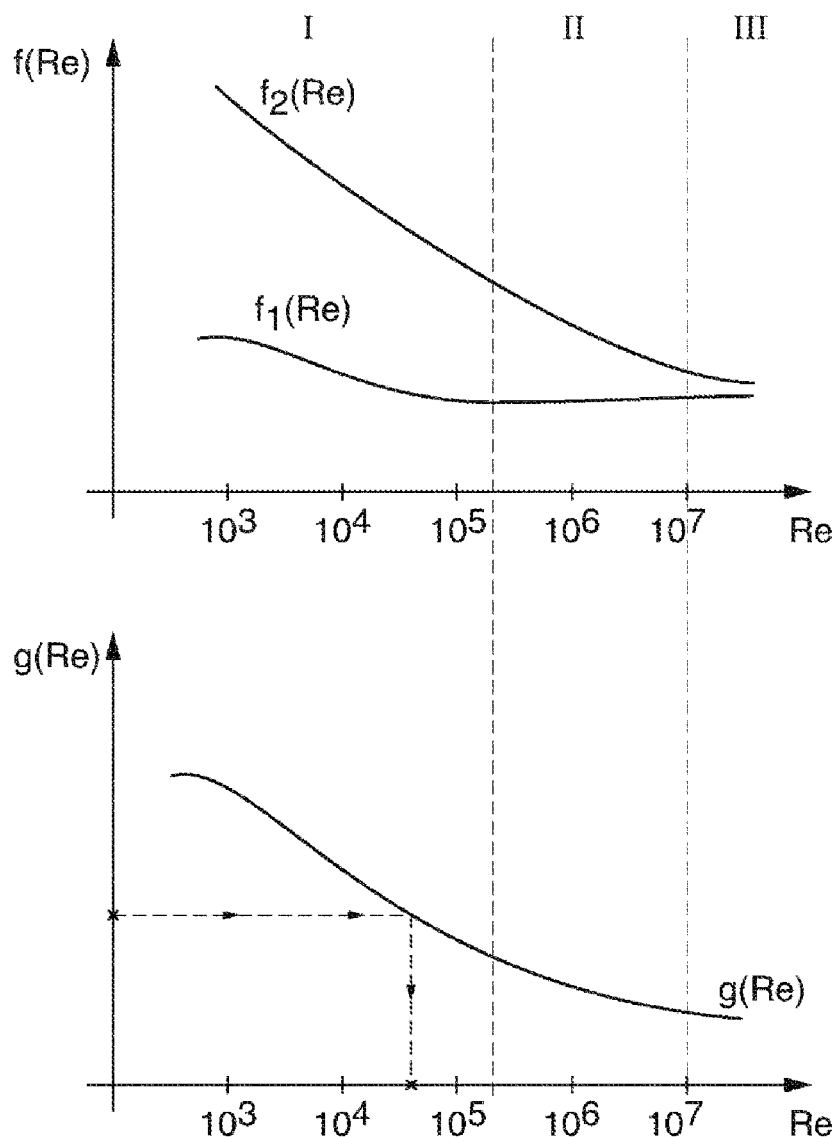
FIG. 4 shows two graphs, wherein the first graph shows the functions $f_1$ and $f_2$ as a function of the Reynolds number, and the second graph shows the quotient of the two functions $f_1$ and $f_2$ as a function of the Reynolds number.

FIG. 4 shows two diagrams, wherein the first diagram shows a relationship between the individual correction factors $f_1$, $f_2$ and the Reynolds number of the flowing medium in the measuring tube, and the second diagram shows a relationship between the quotients of the correction factors g and the Reynolds number of the flowing medium in the measuring tube. The two diagrams are limited to a Reynolds-number range of approximately $10^3$ to $10^7$. The correction factors $f_1$ and $f_2$ are each linked to one of the two potential differences tapped by different measuring electrode pairs. The curve of the functions $f_1$ and $f_2$ has three ranges (I, II, III). In the first and third ranges (I, III), the curve of $f_1$ is not constant. In this example, the curve has a negative slope in the first range (I) and a positive slope in the third range (III). In contrast, the curve of $f_1$ is constant in the second range (II). The flow meter is linear for this Reynolds-number range. The second function $f_2$ is bijective, at least in the second range. In the example shown, the curve of $f_2$ is also bijective in the first and third ranges (I, III). For the quotient g, this means that it is bijective in ranges one through three (I, II, III). A Reynolds number can thus be unambiguously assigned to each quotient of the measurement data of the two measurement variables. Measurement deviations can be corrected, taking into account the correction function, for the ranges in which the flow rate is sensitive to Reynolds number changes (see ranges I and III).

Figure 5:
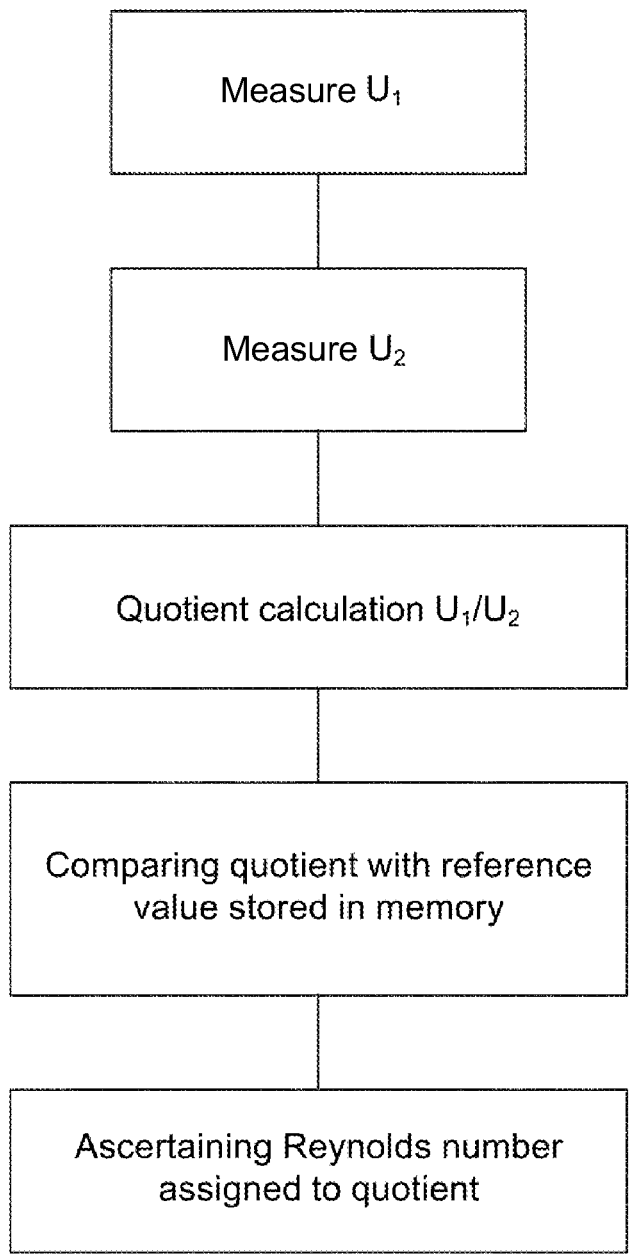
FIG. 5 shows a flow diagram of an exemplary embodiment of the method for operating the magnetic-inductive flow meter of the present disclosure.

FIG. 5 shows a flow diagram of an embodiment of the method for operating a magnetic-inductive flow meter. In a first step, the first potential difference $U_1$ is measured at the first measuring electrode pair. In a second step, the second potential difference $U_2$ is measured at the second measuring electrode pair. As an alternative to measuring the potential difference, in both aforementioned steps, the potentials at the respective measuring electrodes can also be measured in relation to the reference potential, and the difference, e.g., in the analysis circuit, can be calculated. The two first steps do not have to be carried out subsequently, but can also take place simultaneously. It is also possible for the second potential difference $U_2$ to be measured first, and then the first potential difference $U_1$. However, measuring voltages of two measuring phases, in which different, especially opposite, direct voltages are respectively applied to the coils and in which the magnetic field has been incorporated, are usually taken into account for determining the flow rate or the volumetric flow. An offset in the measuring voltage can be compensated for thereby. The measurement of the potential difference or the potentials takes place via a measuring circuit. The analysis circuit calculates a quotient of the two measured values, especially potential differences, and compares this quotient with a Reynolds number assigned to this ascertained quotient. This Reynolds number is stored in a memory. Alternatively, a mathematical equation or a mathematical function which assigns a Reynolds number or a Reynolds-number range to a quotient can also be stored in the memory. Alternatively, data that have been ascertained in a calibration process can also be stored in the memory. The data can be the reference values measured in the calibration process, but also extrapolated values or values of a smoothed characteristic curve or fit function of the measurement data, for example. The reference values can, in a calibration process, be determined experimentally or by means of a simulation program.

The invention claimed is:

1. A magnetic-inductive flow meter, comprising:
a measuring tube adapted to conduct a flowable medium and including a wall;
at least three measuring electrodes disposed in the wall such that each measuring electrode is in galvanic contact with the flowing medium;
at least one magnetic field-generating device configured to generate a magnetic field that passes through the measuring tube;
a measuring circuit configured to determine at least one measurement variable, wherein measured values of a first measurement variable of the at least one measurement variable are determined at a first measuring electrode pair, which includes two measuring electrodes of the at least three measuring electrodes; and
an analysis circuit configured to determine a Reynolds number and/or a kinematic viscosity value of the medium in the measuring tube using measured values of the first measurement variable and a second measurement variable, which differs from the first measurement variable,
wherein measured values of the second measurement variable are determined at a second measuring electrode pair or at a third measuring electrode relative to a reference potential, and wherein the at least three measuring electrodes are arranged in the measuring tube such that, in a test measurement, quotients of current measured values of the first and second measurement variables correspond bijectively to the Reynolds number (Re) of the flowing medium in the measuring tube, at least within a Reynolds-number range of $1,000 \leq Re \leq 1,000,000$.

2. The magnetic-inductive flow meter of claim 1, wherein the quotients of current measured values of the first and second measurement variables correspond bijectively to the Reynolds number (Re) of the flowing medium in the measuring tube, at least within a Reynolds-number range of $10,000 \leq Re \leq 100,000$.

3. The magnetic-inductive flow meter of claim 1, wherein the at least three measuring electrodes are arranged substantially in a cross-sectional plane,
wherein a first radius intersecting a second measuring electrode of the first measuring electrode pair and a second radius intersecting the third measuring electrode span an angle of at least 20°,
wherein the measuring circuit is configured to determine measured values of the first measurement variable between the second measuring electrode and a first measuring electrode of the first measuring electrode pair and to determine measured values of the second measurement variable between the first and third measuring electrodes or at the third measuring electrode relative to the reference potential.

4. The magnetic-inductive flow meter of claim 3, wherein the angle spanning the first radius and the second radius is at least 40° but no more than 60°.

5. The magnetic-inductive flow meter of claim 1, wherein a first measuring electrode axis intersecting the first measuring electrode pair and a second measuring electrode axis intersecting the third measuring electrode and a fourth measuring electrode are substantially parallel,
wherein the measuring circuit is configured to determine measured values of the first measurement variable between the first measuring electrode pair and to determine measured values of the second measurement variable between the third and fourth measuring electrodes.

6. The magnetic-inductive flow meter of claim 1, wherein, in a test measurement, the first measurement variable behaves substantially proportionally to a flow rate of the medium within a Reynolds-number range of $10{,}000 \leq Re \leq 1{,}000{,}000$, and wherein, in the test measurement, a change in the second measurement variable within a Reynolds-number range of $10{,}000 \leq Re \leq 1{,}000{,}000$ with increasing Reynolds number is not constant.

7. The magnetic-inductive flow meter of claim 1, wherein, in a test measurement, the medium is a Newtonian fluid, wherein, in the test measurement, the flow meter is introduced into a pipeline with a straight inlet section of at least DN 20 such that a substantially symmetrical flow profile is present in a measurement region, and wherein the measuring tube has a diameter of DN 80.

8. The magnetic-inductive flow meter of claim 1, wherein the magnetic field-generating device includes two oppositely attached coils that are connected in series in the same direction.

9. A method for operating a magnetic-inductive flow meter, the method comprising:

providing a magnetic-inductive flow meter according to claim 1;

detecting a measured value of the first measurement variable and a measured value of the second measurement variable, wherein the respective measured values of the first and second measurement variables are determined at different measuring electrode pairs; and determining a Reynolds number dependent upon the measured values of the first and second measurement variables.

10. The method of claim 9, further comprising calculating a corrected flow rate and/or a corrected volumetric flow using a correction factor, which depends upon the determined Reynolds number.

11. The method of claim 9, further comprising determining a kinematic viscosity value of the medium using measured values of the first or the second measurement variable and the determined Reynolds number.

12. The method of claim 9, wherein a map that assigns Reynolds numbers to quotients of the first and second measurement variables is bijective, at least within a Reynolds-number range of $1{,}000 \leq Re \leq 1{,}000{,}000$.

13. The method of claim 12, wherein the map that assigns Reynolds numbers to quotients of the first and second measurement variables is bijective, at least within a Reynolds-number (Re) range of $10{,}000 \leq Re \leq 100{,}000$.

14. The method of claim 9, wherein the first measurement variable is a corresponding potential difference of the first measuring electrode pair, and the second measurement variable is a corresponding potential difference of the second measuring electrode pair or of the third measuring electrode and the reference potential.

15. The magnetic-inductive flow meter of claim 1, wherein the first measurement variable is a corresponding potential difference of the first measuring electrode pair, and the second measurement variable is a corresponding potential difference of the second measuring electrode pair or of the third measuring electrode and the reference potential.

* * * * *